United States Patent [19]

Onda et al.

[11] Patent Number: 5,619,740
[45] Date of Patent: Apr. 8, 1997

[54] APPARATUS FOR PREVENTING FILM PERFORATION DAMAGE DURING LOADING

[75] Inventors: Kazuhiko Onda; Yasuhiko Tanaka, both of Omiya, Japan

[73] Assignee: Fuji Photo Optical Co. Ltd, Omiya, Japan

[21] Appl. No.: 401,252

[22] Filed: Mar. 9, 1995

[30] Foreign Application Priority Data

Mar. 24, 1994 [JP] Japan .................................. 6-079324

[51] Int. Cl.$^6$ ........................................................ G03B 1/00
[52] U.S. Cl. ................................................ 396/415; 396/416
[58] Field of Search .......................... 354/173.1, 173.11, 354/212, 213, 214, 215; 242/332, 349, 538

[56] References Cited

U.S. PATENT DOCUMENTS 5,136,313  8/1992  Muramatsu et al. ................ 354/212 X

FOREIGN PATENT DOCUMENTS 3200947A  9/1991  Japan .

OTHER PUBLICATIONS

English abstract and Figure of Japan 3–200947(A). Sep. 2, 1991.

*Primary Examiner*—Howard B. Blankenship
*Attorney, Agent, or Firm*—Ronald R. Snider

[57] ABSTRACT

A film loading apparatus for preventing the breakage or enlargement of a film perforation. The apparatus comprises a spool having catches each of which engages a perforation of film, and a film feeding member having a claw which reciprocatingly moves in synchronism with the rotation of the spool. No catch is provided at the portion of the spool which passes a film engaging position at the time of backward movement of the film feeding member and in a predetermined range between that portion and the portion which passes the film engaging position at the time of forward movement of the film feeding member. No catch is engaged with a perforation of the film during or immediately before backward movement of the film feeding portion, thereby preventing the breakage or enlargement of a film perforation. By providing a rib at the portion of the spool where no catch is provided and clamping the film between the rib and a film guide plate provided on the inner surface of back lid of the camera, film can be kept in a take-up waiting state, thereby facilitating the film winding operation.

4 Claims, 4 Drawing Sheets

FIG. 1
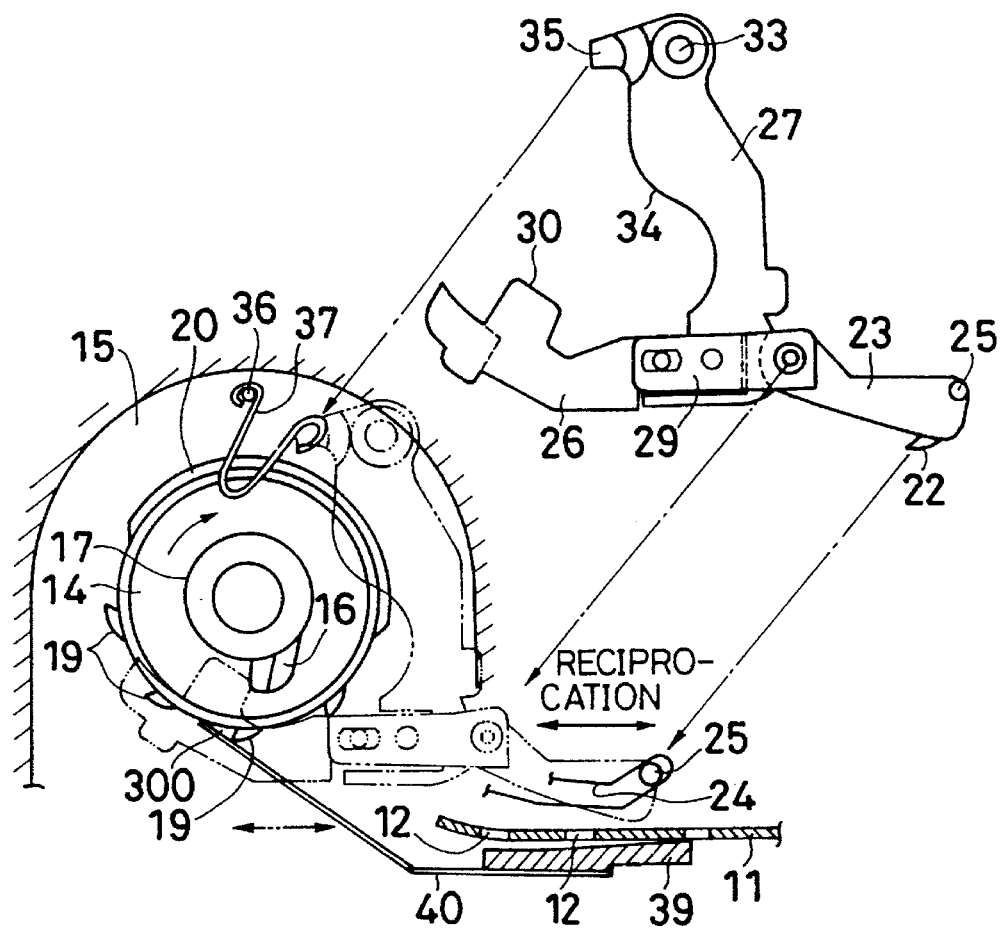
FIG. 2(A)    FIG. 2(B)
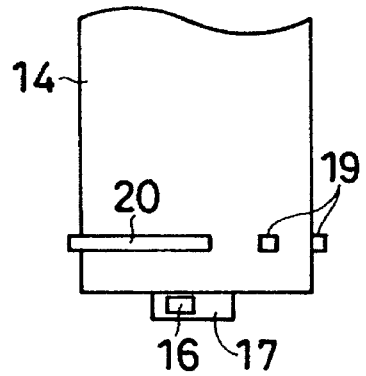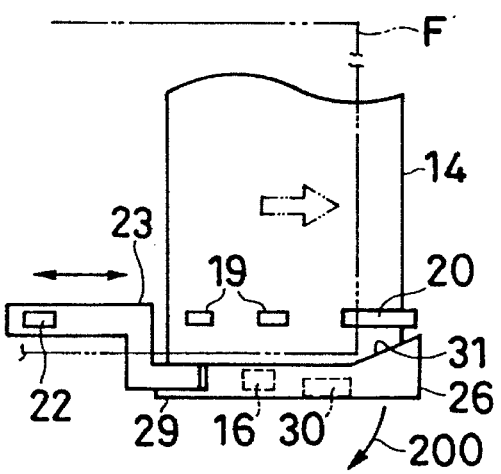

5,619,740

APPARATUS FOR PREVENTING FILM PERFORATION DAMAGE DURING LOADING

BACKGROUND OF THE INVENTION

This application claims the priority of Japanese Patent Application No. 6-79324 filed on Mar. 24, 1994.

1. Field of the Invention

The present invention relates to the structure of a film loading apparatus for winding a predetermined amount of film which is fed from a patrone around a take-up spool spool when the patrone is set in a camera.

2. Description of the Related Art

Autoloading apparatuses for automatically winding a predetermined amount of film which is fed from a patrone around a take-up roll when the patrone is set in a camera are now generally used. As an autoloading apparatus is known not only an apparatus for feeding film to a take-up spool by using a rotating member, but also an apparatus for feeding film to a take-up spool by the reciprocating movement of a feeding member having a claw, as disclosed in, for example, Japanese Patent Laid-Open No. 3-200947. This reciprocating movement system is advantageous in that members such as a gear train and the like which are necessary in the film feeding system using a rotating member are obviated, thereby obviating the space they occupy and, hence, enabling the reduction in the size of a camera as a whole.

FIGS. 6(A) and 6(B) show a conventional film loading apparatus of a reciprocating movement system. In FIGS. 6(A) and 6(B), a take-up spool in a camera is seen from the bottom portion of the camera. In these drawings, a spool 1 is provided with a plurality of catches 2, and a spool cam 4 having a projection 3 is attached to the bottom portion of the spool 1. A film feeding member 5 is provided with a claw 6 and a pin 7. The pin 7 slides along a guide groove 8. The feeding member 5 is also provided with a driving lever (not shown) which engages the spool cam 4, so that the feeding member 5 intermittently reciprocally moves along the guide groove 8 with the rotation of the spool cam 4. A film guide plate 10 having comparatively small elastic force is provided on the inner surface 9 of the back lid of the camera.

According to this structure, the feeding member 5 reciprocally moves with the rotation of the spool 1, and when the claw 6 engages one of the perforations 12 of the film 11 at the time of forward movement of the feeding member 5, the film 11 is fed toward the spool 1. When the catch 2 on the spool 1 engages the perforation 12, the film 11 is wound around the spool 1. In this manner the the film 11 is set in an initial state which allows photographing.

In such a film loading apparatus, however, sometimes a perforation at the forward end portion is inconveniently broken or enlarged (transformed). For example if the claw 6 enters another perforation 12 while the perforation 12 at the forward end portion of the film 11 is engaged with the catch 2 on the spool 1 during the backward movement of the the feeding member 5, the film 11 is pulled in the opposite direction to the feeding direction. As a result, force is applied to the perforation 12 which is engaged with the catch 2 on the spool 1, which may result in the breakage of the perforation 12. In this case, it is impossible to take up the film 11 by the spool 1. Even if the perforation 12 at the forward end of the film 11 is not broken, the force of pulling the film backward sometimes enlarges the perforation 12 which is engaged with the catch 2, so that the forward end of the film 11 is bent toward the outside of the spool 1. In other words, the film 11 detours, and it is loosely wound around the spool 1. If the loosely wound film 11 becomes too bulky, it is impossible to photograph a predetermined number of exposures.

SUMMARY OF THE INVENTION

Accordingly, it is an object of the present invention to eliminate the above-described problems in the related art and to provide a film loading apparatus for a camera which is capable of winding film smoothly around a spool without a breakage or enlargement of a perforation of the film.

To achieve this end, the present invention provides a film loading apparatus for a camera comprising: a film feeding member having a claw for feeding film with a perforation engaged with the claw at the time of loading the film; a spool for taking up the film by engaging a catch with a perforation of the film, and a driving member for reciprocatingly moving the film feeding member in synchronism with the rotation of the spool; wherein no catch is provided at the portion of the spool which passes a film engaging position when the film feeding member moves backward.

It is preferable that no catch is provided in a predetermined range of the spool between the portion which passes the film engaging position when the film feeding member moves backward and the portion which passes the film engaging position when the film feeding member moves forward.

According to this structure, the film feeding member reciprocatingly moves in synchronism with the rotation of the spool, and the film is fed toward the spool by engaging the claw with the perforation. The catch passes the film engaging position during the forward movement of the film feeding member, and the catch engages the perforation, whereby the film is wound around the spool. On the other hand, no catch passes the film engaging position during or immediately before backward movement. Therefore, even if the claw engages the perforation during backward movement and pulls the film backward, since no catch on the spool engages the perforation, there is no breakage or enlargement of the perforation.

It is also possible to form a rib having approximately the same height as the catch from the peripheral surface of the spool at the portion of the spool which passes a film engaging position when the film feeding member moves backward, and keep the film in a take-up waiting state by clamping the fed film between the rib and a film guide plate provided on the inner surface of the back lid of the camera so as to extend to the vicinity of the spool. According to this structure, the catch which comes to the film in the take-up waiting state can smoothly engage the perforation.

The driving member for reciprocatingly moving the film feeding member in synchronism with the rotation of the spool may be composed of a spool cam provided on the spool, a first driving member for moving the film feeding member forward with the rotation of the spool cam at the initial stage of one rotation of the spool cam, and a second driving member for moving the film feeding member backward with the rotation of the spool cam after the operation of the first driving lever in one rotation of the spool cam.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a bottom view of an embodiment of a film loading apparatus for a camera according to the present invention;

FIG. 2(A) shows the structure of the spool shown in FIG. 1;

FIG. 2(B) shows the relationship between the spool shown in FIG. 1 and members in the vicinity thereof, seen from the back of a camera;

DESCRIPTION OF THE PREFERRED EMBODIMENT

Figure 3:
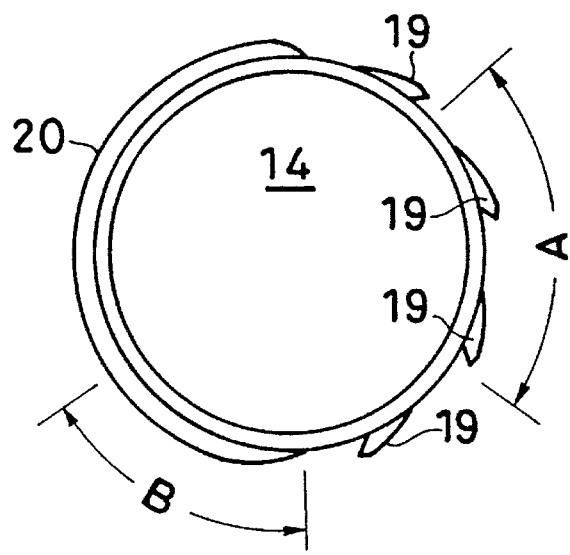
FIG. 3 shows the positional relationship between the catches and the rib on the spool in the embodiment.

FIGS. 1 to 3 show the structure of an embodiment of a film loading apparatus for a camera according to the present invention. In FIG. 1, a spool 14 for taking up film is rotatably disposed in a take-up chamber 15, and the spool 14 is rotated clockwise by a motor at the time of film loading and the like, as indicated by the arrow in FIG. 1. A spool cam 17 having a projection 16 is provided on the bottom portion of the spool 14. Catches 19 and a rib 20 are formed at the lower portion of the peripheral surface of the spool 14, as shown in FIG. 2(A). More specifically, in this embodiment, four catches 19 are provided along one half of the outer periphery of the spool 14 and a rib 20 having the same height as each catch 19 from the peripheral surface of the spool 14 are provided along the other half of the outer periphery.

As shown in FIG. 2(B), a feeding member 23 provided with a claw 22 is disposed at the same height as the catches 19 on the spool 14 from the bottom of the camera, and the feeding member 23 is also provided with a pin 25 which is guided along a guide groove 24, as shown in FIG. 1. A first driving lever 26 for forward movement and a second driving lever 27 for backward movement are attached to the feeding member 23 in such a manner as to clamp the spool cam 17 which is situated slightly lower than the feeding member 23. The first driving lever 26 is connected to the feeding member 23 through a leaf spring 29 so as to be shunted downward, as indicated by the arrow 200 in FIG. 2(B). The first driving lever 26 is provided with a projection 30 which is engaged with the projection 16 of the spool cam 17 and the upper surface of the forward end portion thereof is tapered as a tapered surface 31. When the spool cam 17 is rotated at the time of film loading, the projection 16 of the spool cam 17 engages the projection 30, thereby moving the feeding member 23 forward (leftward in FIG. 1). When the fed film F passes the tapered surface 31 of the first driving lever 26, as shown in FIG. 2(B), the first driving lever 26 shunts downward, so that the projection 16 is not engaged with the projection 30 and, as a result, the reciprocation of the feeding member 23 is suspended.

The second driving lever 27 is rockably supported by a shaft 33, and it has a cam surface 34 which comes into contact with the projection 16 of the spool cam 17. When the projection 16 pushes the cam surface 34 at the time of rotation of the spool cam 17, the second driving lever 27 rocks around the shaft 33, thereby moving the feeding member 23 backward. As is clear from FIG. 1, the reciprocation is conducted not continuously but intermittently in this embodiment. When the projection 16 engages the projection 30, the feeding member 23 moves forward, and while the projection 16 is in contact with the cam surface 34, the feeding member 23 moves backward. That is, the feeding member 23 conducts one cycle of reciprocation during one rotation of the spool 14. A toggle spring 37 is interposed between a projection 35 of the second driving lever 27 and a pin 36 provided in the take-up chamber 15 so as to hold the feeding member 23 in a stationary state at each terminal point of reciprocation.

As shown in FIG. 1, a film guide plate 40 having elastic force is provided on the inner surface 39 of the back lid of the camera, and film 11 is guided toward the spool 14 by the film guide plate 40. The end portion of the film guide plate 40 serves as a film engaging position 300 at which the catch 19 of the spool 14 engages the perforation 12 of the film 11.

FIG. 3 shows the positional relationship between the catches 19 and the rib 20 on the spool 14. As described above, the feeding member 23 conducts one cycle of reciprocation during one rotation of the spool 14, and the portion of the spool 14 indicated by the arrow A passes the film engaging position 300 at the time of forward movement, while the portion of the spool 14 indicated by the arrow B passes the film engaging position 300 at the time of backward movement. As shown in FIG. 3, in this embodiment, the rib 20 is provided in a wider range than the portion B which passes the film engaging position 300 at the time of backward movement. That is, the catches 19 which will pass the film engaging position 300 before backward movement begins are removed, and the rib 20 is extended to the portion from which the catches 19 are removed. In this manner, the perforation 12 is prevented from being engaged with the catch 19 immediately before backward movement.

Figure 4:
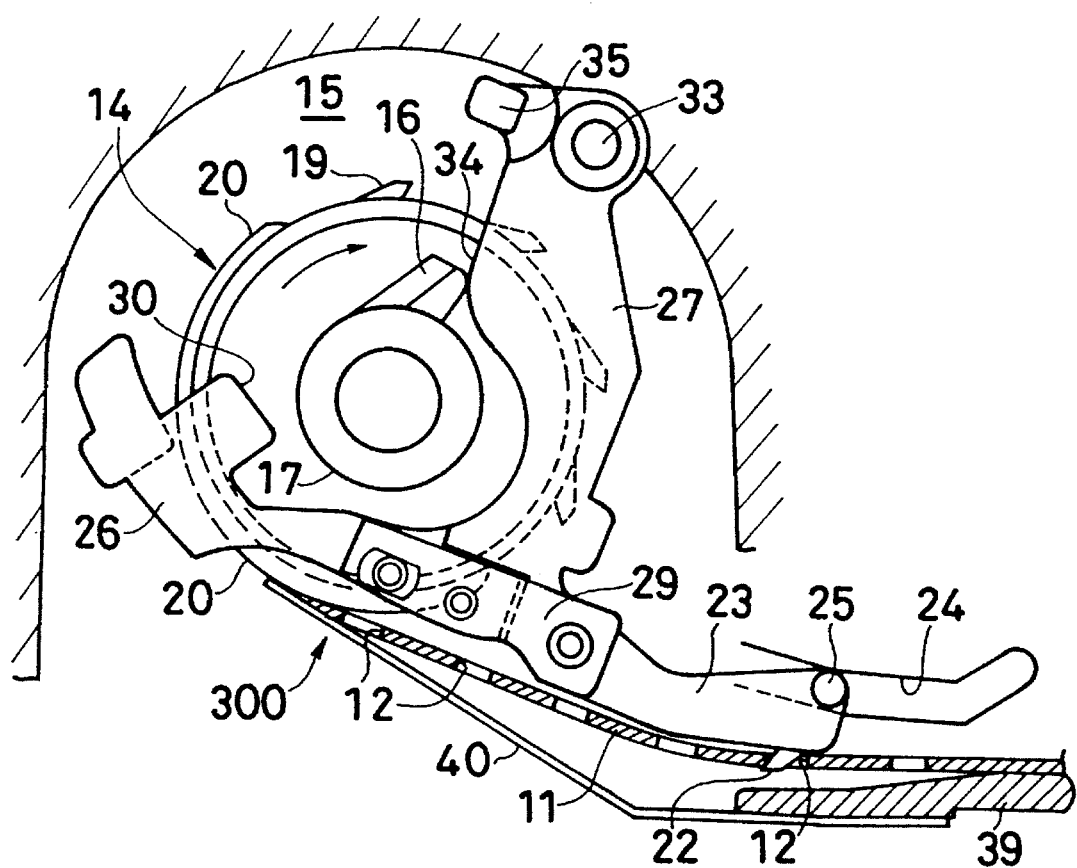
FIG. 4 shows the embodiment with the film in a take-up waiting state.

The operation of this embodiment having the above-described structure will now be explained with reference to FIGS. 4 and 5. When the back lid of a camera is closed after a patrone is set in the camera, the spool 14 is rotated by a motor. When the spool 14 is rotated one turn, the feeding member 23 conducts one cycle of reciprocation. FIG. 4 shows the feeding member 23 after the end of forward movement and immediately before the start of backward movement. The film 11 fed by the feeding member 23 at the time of forward movement is clamped between the rib 20 and the film guiding plate 40. Since the rib 20 having the same height as the catch 19 from the peripheral surface of the spool 14 is provided in this embodiment, it is possible to clamp the film 11 with a predetermined clamping force, as shown in FIG. 4, so that the film 11 assumes a take-up waiting state.

When the projection 16 is brought into contact with the cam surface of the second driving lever 27 by the rotation of the spool cam 17, the second lever 27 rocks around the shaft 33, whereby the feeding member 23 moves backward (rightward in FIG. 4). At this time, since there is no catch 19 at the portion of the spool 14 which comes into contact with the film 11, the catch 19 of the spool 14 does not engage the perforation 12 at the forward end of the film 11, and the claw 22 of the feeding member 23 is drawn out of the perforation 12 and returned to the original position. Consequently, a smooth returning operation is enabled without a fear of the film 11 being pulled from both sides. Thereafter, when the first catch 19 that comes with a next rotation of the spool 14 engages the perforation 12, the film 11 in the take-up waiting state is caught by the spool 14, thereby enabling stable loading of the film 11.

Figure 5A:
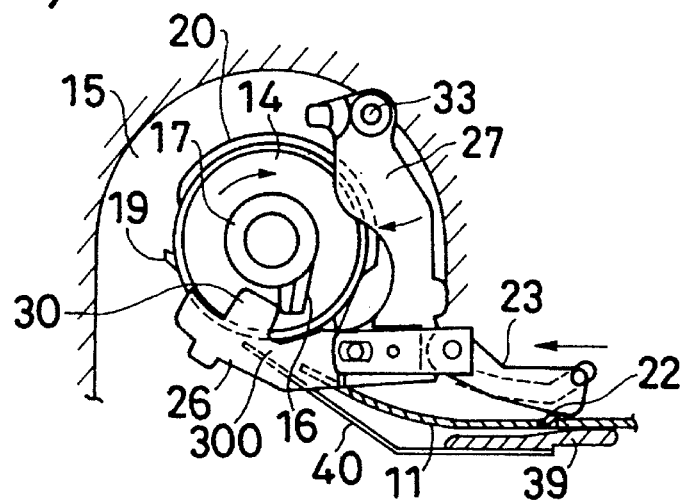
FIG. 5(A) shows the operation of taking up the film by the catch at a rear portion in the direction of rotation at the initial stage of the forward movement of the film feeding member in the embodiment.
Figure 5B:
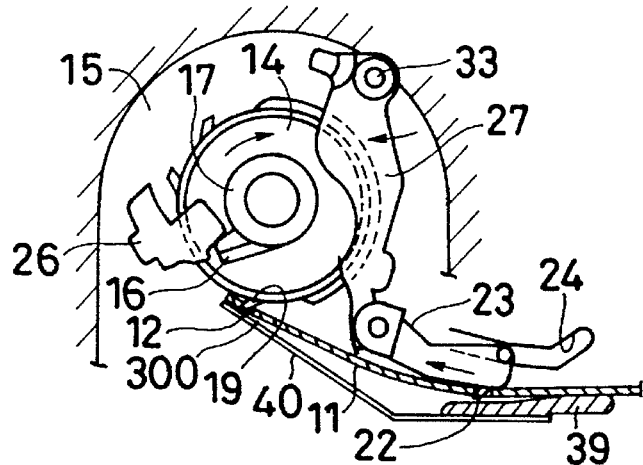
FIG. 5(B) shows the operation continued from the operation shown in FIG. 5(A), in which the film is taken up by the catch.
Figure 5C:
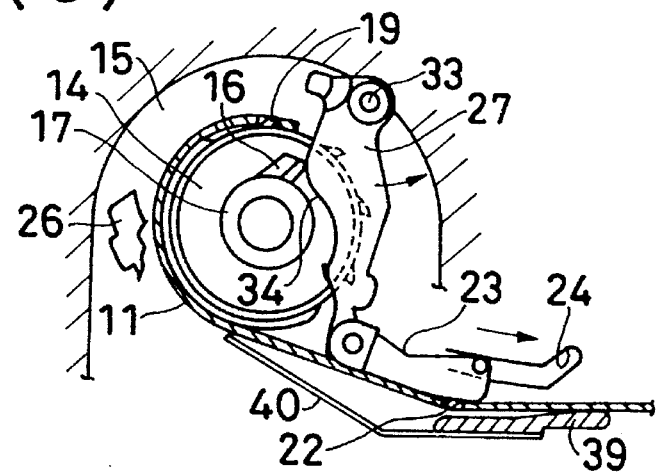
FIG. 5(C) shows the operation continued from the operation shown in FIG. 5(B), in which the film feeding member moves backward.
Figure 6A:
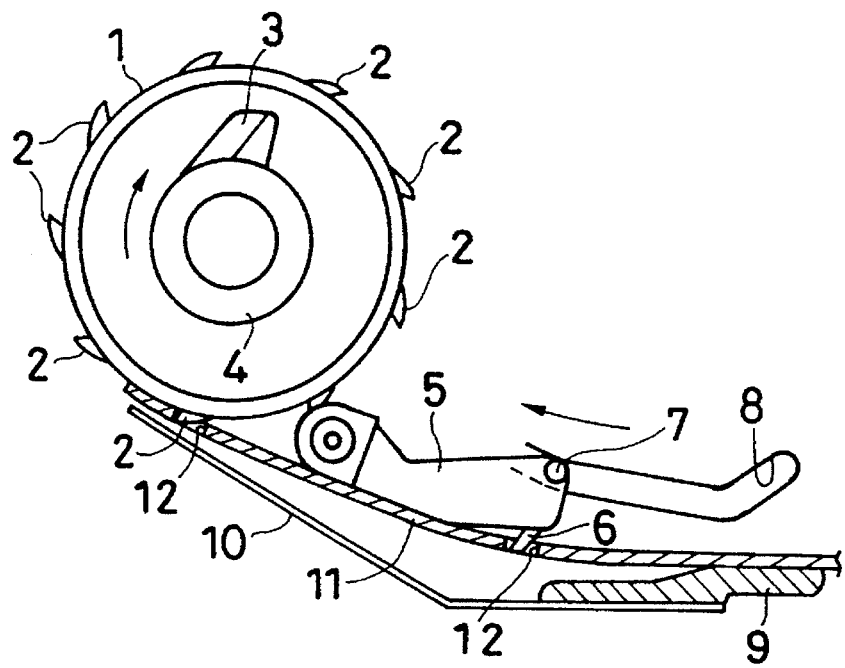
FIG. 6(A) is a bottom view of a conventional film loading apparatus at the time of forward movement.
Figure 6B:
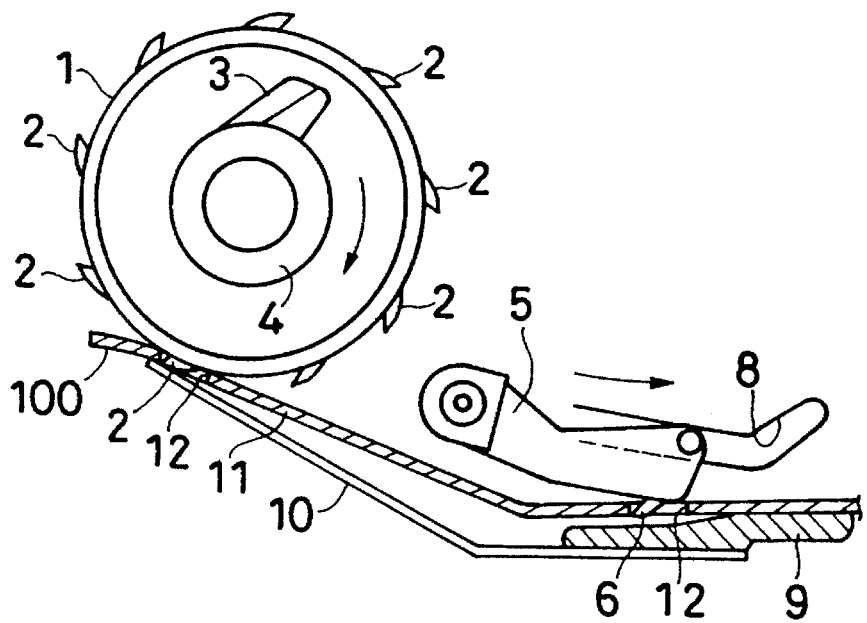
FIG. 6(B) is a bottom view of the apparatus shown in FIG. 6(A) at the time of backward movement.

FIGS. 5(A) to 5(C) show the operation of the embodiment when the film is caught by the last catch 19 that comes with a rotation of the spool 14 engages the perforation 12, and the film 11 is caught by the spool 14. In FIG. 5(A), the projection 16 of the spool cam 17 is engaged with the projection 30 of the first driving lever 26. When the spool 14 rotates in this state, the second lever 27 rocks around the shaft 33, so that the feeding member 23 moves forward (leftward in FIG. 5A) and the film 11 is fed toward the spool 14 by the claw 22. When the film 11 is fed to the film engaging position 300, as shown in FIG. 5(B), the perforation 12 at the forward end portion of the film 11 engages the catch 19, so that the film 11 is caught and even after the feeding member 23 is stopped, the film 11 is wound around the spool 14.

When the spool 14 rotates until the last catch 19 comes to the position shown in FIG. 5(C), the projection 16 comes into contact with the cam surface 34 of the second driving lever 27, and the backward movement of the feeding member 23 is started. During the backward movement, the film 11 is engaged with the catch 19. However, since a certain amount of film is wound around the spool 14, even if the film 11 is pulled by the claw 22 which is in the process of returning, since the film winding force (frictional force or the like) is strong, the perforation 12 is not broken nor enlarged. Therefore, good loading is also enabled in this case.

In this embodiment, since the catch 19 of the spool does not engage the perforation 12 immediately before or during backward movement, the breakage or enlargement of the perforation 12 is prevented. The rib 20 is provided over the range of the spool 14 at which no catch 19 is provided in this embodiment. However, even if the rib 20 is not provided, since there is no engagement between the catch 19 and the perforation 12 during backward movement, good loading is enabled.

As explained above, according to the present invention, the breakage or enlargement of a film perforation is prevented, and the film is smoothly wound around a spool without a fear of reduction in the number of exposures due to loose film winding. If a rib is formed at the portion of the spool which passes the film engaging position at the time of backward movement, it is possible to hold the film in a take-up waiting state, so that smooth winding of the film around the spool is realized.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A film loading apparatus for a camera comprising:

a film feeding member having a claw for feeding film with a perforation engaged with said claw at the time of loading said film;

a spool for taking up said film by engaging a catch with a perforation of said film;

a driving member for reciprocatingly moving said film feeding member in synchronism with the rotation of said spool;

wherein no catch is providing at the portion of said spool which passes a film engaging position when said film feeding member moves backward; and wherein no catch is provided in a predetermined range of said spool between the portion which passes said film engaging position when said film feeding member moves backward and the portion which passes said film engaging position when said film feeding member moves forward.

2. A film loading apparatus for a camera comprising:

a film feeding member having a claw for feeding film with a perforation engaged with said claw at the time of loading said film;

a spool for taking up said film by engaging a catch with a perforation of said film;

a driving member for reciprocatingly moving said film feeding member in synchronism with the rotation of said spool;

wherein no catch is providing at the portion of said spool which passes a film engaging position when said film feeding member moves backward;

a rib having approximately the same height as said catch from the peripheral surface of said spool and provided at said portion of said spool which passes said film engaging position when said film feeding member moves backward; and a film guide plate disposed on an inner surface of a back lid of said camera so as to extend to the vicinity of said spool in such a manner as to clamp said film between said rib and said film guide plate.

3. A film loading apparatus for a camera according to claim 1 further comprising:

a spool cam provided on said spool;

a first driving lever for moving said film feeding member forward with the rotation of said spool cam at the initial stage of one rotation of said spool cam; and a second driving member for moving said film feeding member backward with the rotation of said spool cam after the operation of said first driving lever in one rotation of said spool cam.

4. A film loading apparatus for a camera comprising:

a film feeding member having a claw for feeding film with a perforation engaged with said claw at the time of loading said film;

a spool for taking up said film by engaging a catch with a perforation of said film except at the time of forward movement of said film feeding member, wherein no catch that will be engaged with said perforation of said film at the time of backward movement of said film feeding member is provided;

a spool cam provided on said spool;

a first driving lever for moving said film feeding member forward with the rotation of said spool cam at the initial stage of one rotation of said spool cam; and a second driving member for moving said film feeding member backward with the rotation of said spool cam after the operation of said first driving lever in one rotation of said spool cam;

a rib having approximately the same height as said catch from the peripheral surface of said spool and provided at a portion of said spool which passes said film engaging position when said film feeding member moves backward; and a film guide plate disposed on an inner surface of a back lid of said camera so as to extend to the vicinity of said spool in such a manner as to clamp said film between said rib and said film guide plate.

* * * * *